United States Patent
Shi et al.

(10) Patent No.: US 11,737,161 B2
(45) Date of Patent: *Aug. 22, 2023

(54) METHOD FOR INDICATING PROTOCOL DATA UNIT SESSION STATUS, TERMINAL DEVICE, AND NON-TRANSITORY COMPUTER-READABLE STORAGE MEDIUM

(71) Applicant: GUANGDONG OPPO MOBILE TELECOMMUNICATIONS CORP., LTD., Guangdong (CN)

(72) Inventors: Cong Shi, Guangdong (CN); Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,143

(22) Filed: Jan. 5, 2022

(65) Prior Publication Data
US 2022/0132621 A1    Apr. 28, 2022

Related U.S. Application Data

(63) Continuation of application No. 17/241,418, filed on Apr. 27, 2021, now Pat. No. 11,265,959, which is a
(Continued)

(51) Int. Cl.
*H04W 76/27* (2018.01)
*H04W 76/30* (2018.01)
*H04W 76/11* (2018.01)

(52) U.S. Cl.
CPC ............ *H04W 76/27* (2018.02); *H04W 76/11* (2018.02); *H04W 76/30* (2018.02)

(58) Field of Classification Search
CPC ...... H04W 76/27; H04W 76/11; H04W 76/30
See application file for complete search history.

(56) References Cited

U.S. PATENT DOCUMENTS 9,392,582 B2    7/2016    Kwon et al.
10,251,147 B2   4/2019    Park et al.
(Continued)

FOREIGN PATENT DOCUMENTS

CN    106060900 A    10/2016
CN    108347751 A     7/2018
(Continued)

OTHER PUBLICATIONS

LG Electronics. "Clarification on PDU Session Activation and Deactivation" 3GPP TSG-SA WG2 Meeting #129 S2-1811235, Oct. 17, 2018 (Oct. 17, 2018), reason for change, summary of change, and section 4.3.7.
(Continued)

*Primary Examiner* — Mohammad S Anwar
(74) *Attorney, Agent, or Firm* — Perkins Coie LLP

(57) ABSTRACT

The method for indicating protocol data unit session status includes that: a terminal device indicates activation and/or deactivation of a protocol data unit session based on configuration signaling sent by a network device. A terminal device and a non-transitory computer-readable storage medium are also provided.

18 Claims, 2 Drawing Sheets

A terminal device indicates activation and/or deactivation of a protocol PDU session based on configuration signaling sent by a network device ⟋ S201

Related U.S. Application Data continuation of application No. PCT/CN2018/113211, filed on Oct. 31, 2018.

(56) References Cited

U.S. PATENT DOCUMENTS

| | | | |
|---|---|---|---|
| 11,265,959 B2* | 3/2022 | Shi | .......... H04W 76/11 |
| 2010/0240406 A1 | 9/2010 | Tseng | |
| 2013/0039339 A1 | 2/2013 | Rayavarapu | |
| 2015/0373559 A1 | 12/2015 | Hong | |
| 2017/0374610 A1 | 12/2017 | Kim et al. | |
| 2018/0199240 A1 | 7/2018 | Dao | |
| 2018/0270715 A1 | 9/2018 | Lee et al. | |
| 2018/0270782 A1 | 9/2018 | Park et al. | |
| 2019/0166647 A1 | 5/2019 | Velev et al. | |
| 2019/0350035 A1 | 11/2019 | Kim et al. | |

FOREIGN PATENT DOCUMENTS

| | | |
|---|---|---|
| CN | 108370600 A | 8/2018 |
| CN | 108400997 A | 8/2018 |
| CN | 108574969 A | 9/2018 |
| CN | 108605269 A | 9/2018 |
| CN | 108632915 A | 10/2018 |
| RU | 2456778 C2 | 7/2012 |
| RU | 2505833 C2 | 1/2014 |
| RU | 2521486 C2 | 6/2014 |
| RU | 2558733 C2 | 8/2015 |
| WO | 2018034337 A1 | 2/2018 |
| WO | 2018128458 A1 | 7/2018 |
| WO | 2018174509 A1 | 9/2018 |

OTHER PUBLICATIONS

TS 23.502 V15.3.0, 3rd Generation Partnership Project, Technical Specification Group Services and System Aspects, Procedures for the 5G System (Sep. 2018).

International Search Report in the international application No. PCT/CN2018/113211, dated Jun. 17, 2019.
First Office Action of the Chinese application No. 202010778757.9, dated Sep. 2, 2021. 17 pages with English translation.
Supplementary European Search Report in the European application No. 18938522.2, dated Sep. 23, 2021. 3 pages.
Written Opinion of the International Search Authority In the international application No. PCT/CN2018/113211, dated Jun. 17, 2019. 7 pages with English translation.
First Office Action of the U.S. Appl. No. 17/241,418, dated Jun. 21, 2021.
Notice of Allowance of the U.S. Appl. No. 17/241,418, dated Oct. 20, 2021.
Corrected Notice of Allowance of the U.S. Appl. No. 17/241,418, dated Nov. 3, 2021.
Google Inc. Ericsson, NTT Docomo, Inc. "Correction to DRB release" 3GPP TSG-RAN2 Meeting #103bis R2-1816008 Chengdu, China, Oct. 8-12, 2018. 5 pages.
Google Inc. "Correction to full configuration" 3GPP TSG-RAN2 Meeting #103bis R2-1816047 Chengdu, China, Oct. 8-12, 2018. 4 pages.
LG Electronics Inc. "Discussion on SDAP entity handling" 3GPP TSG-RAN2 Meeting#102 R2-1808626 Seoul, Korea, May 21-25, 2018. 6 pages.
First Office Action of the Japanese application No. 2021-547617, dated Aug. 5, 2022. 6 pages.
European Search Report in the European application No. 22190295. 0, dated Oct. 18, 2022. 9 pages.
First Office Action of the Canadian application No. 3118227, dated May 13, 2022. 4 pages.
First Office Action of the Russian application No. 2021114975, dated Apr. 25, 2022. 10 pages with English translation.
Office Action of the Indian application No. 202117021781, dated Mar. 9, 2022. 8 pages with English translation.
First Written Opinion of the Singaporean application No. 11202104406Q, dated Nov. 17, 2022. 9 pages.

* cited by examiner

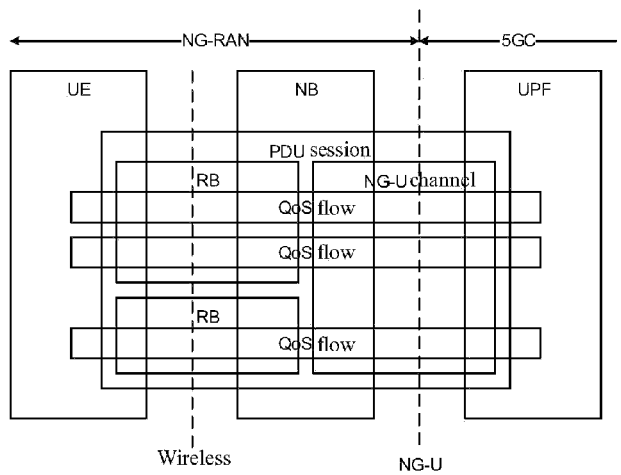
FIG. 1
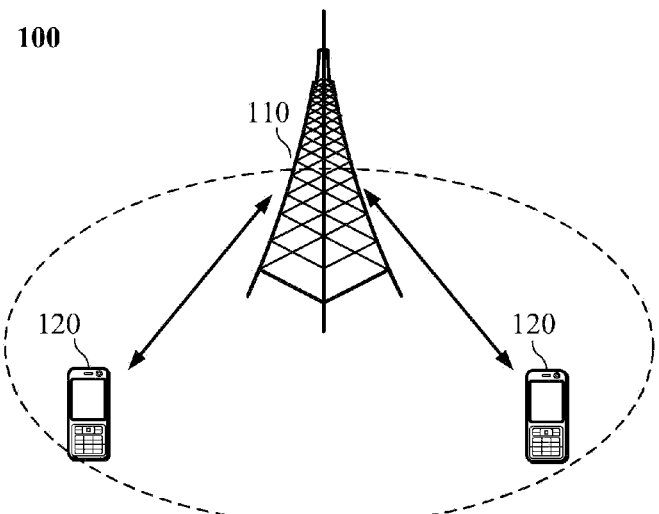
FIG. 2
| A terminal device indicates activation and/or deactivation of a protocol PDU session based on configuration signaling sent by a network device | ⟋ S201 |
FIG. 3

METHOD FOR INDICATING PROTOCOL DATA UNIT SESSION STATUS, TERMINAL DEVICE, AND NON-TRANSITORY COMPUTER-READABLE STORAGE MEDIUM

CROSS-REFERENCE TO RELATED APPLICATION

This application is a continuation application of U.S. application Ser. No. 17/241,418, filed on Apr. 27, 2021, which is a U.S. continuation application of International Application No. PCT/CN2018/113211, entitled "PROTOCOL DATA UNIT SESSION STATUS INDICATION METHOD, TERMINAL DEVICE, AND STORAGE MEDIUM", filed on Oct. 31, 2018, the contents of which are hereby incorporated by reference in their entirety.

TECHNICAL FIELD

The present disclosure relates to the technical field of wireless communications, and in particular to a method for indicating protocol data unit session status, a terminal device, and a non-transitory computer-readable storage medium.

BACKGROUND

At a non-access stratum (NAS) layer of a terminal device (e.g. a user equipment, UE), the UE needs to know the status (such as an activated state or a deactivated state) of a protocol data unit (PDU) session so as to determine whether there is a need to activate the PDU session.

SUMMARY

The aspects of the present disclosure provide a method for indicating PDU session status, a terminal device, and a non-transitory computer-readable storage medium In a first aspect, an embodiment of the present disclosure provides a method for indicating PDU session status, which comprises: indicating, by a terminal device, activation and/or deactivation of a PDU session based on configuration signaling sent by a network device.

In a second aspect, an embodiment of the present disclosure provides a terminal device, which comprises: a processor configured to indicate, through a network interface, activation and/or deactivation of a protocol data unit session (PDU session) based on configuration signaling sent by a network device.

In a third aspect, an embodiment of the present disclosure provides a non-transitory computer-readable storage medium storing an executable program which, when executed by a processor, implements the method carried out by the terminal device.

BRIEF DESCRIPTION OF THE DRAWINGS

FIG. 1 is a schematic diagram of a QoS model of a related art 5G system;

FIG. 2 is a schematic structural diagram of a communication system according to an embodiment of the present disclosure;

FIG. 3 is a schematic diagram of an alternative process flow of a method for indicating PDU session status according to an embodiment of the present disclosure;

DETAILED DESCRIPTION

Figure 4:
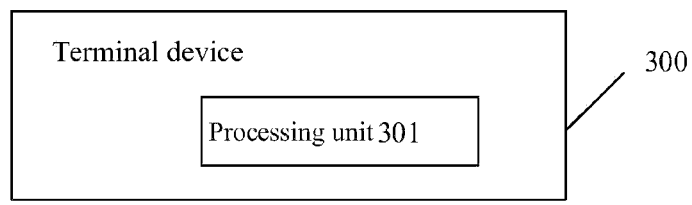
FIG. 4 is a schematic structural diagram of a terminal device provided in an embodiment of the present disclosure.

In order to understand the features and technical contents of the embodiments of the present disclosure in more detail, the implementation of the embodiments of the present disclosure will be described in detail below in conjunction with the accompanying drawings. The accompanying drawings are merely for reference and illustration and are not intended to limit the embodiments of the present disclosure.

According to the related technologies, how to determine the activated state or deactivated state of the PDU session at the NAS layer of the UE is an urgent problem to be solved.

Before detailed description of the embodiments of the present disclosure, a quality of service (QoS) model of a 5G system is briefly described first.

As shown in FIG. 1, one or more PDU sessions are established for each UE; at least one data radio bearer (DRB) is established for each PDU session. For each UE, an NG-RAN at least establishes one DRB for each PDU; a PDU session associated with a DRB is established while establishing the DRB. In addition, the NG-RAN may also establish other DRBs, and there is a correlation between these DRBs and QoS flows of the PDU session; the NG-RAN establishes a correlation between different DRBs and data packets that belong to different PDU sessions.

For each PDU session, when no DRB is configured for the PDU session through RRC signaling and no mapping rule between the PDU session and DRB(s) is configured, the PDU session may be configured with a default DRB, and in this case, the UE maps data packets to the default DRB corresponding to the PDU session.

For each PDU session, how to map a plurality of QoS flows to DRB(s) is performed by the NG-RAN. The NG-RAN may map one GBR flow and one non-GBR flow, or a plurality of GBR flows to the same DRB.

The present disclosure provides a method for indicating PDU session status. The method for indicating PDU session status in the embodiments of the present application may be applied to various communication systems, for example, a Global System for Mobile communication (GSM), a code division multiple access (CDMA) system, a wideband code division multiple access (WCDMA) system, a general packet radio service (GPRS) system, a Long Term Evolution (LTE) system, an LTE frequency division duplex (FDD) system, LTE time division duplex (TDD) system, a universal mobile telecommunication system (UMTS), a worldwide interoperability for microwave access (WiMAX) communication system or a 5G system.

Exemplarily, a communication system 100 applied in the embodiments of the present application is shown in FIG. 2. The communication system 100 may comprise a network device 110 which may be a device that communicates with terminal devices 120 (or referred to as communication terminals, terminals). The network device 110 may provide communication coverage for a specific geographical area, and may communicate with terminal devices located within that coverage area. Alternatively, the network device 110 may be a base transceiver station (BTS) in the GSM system or the CDMA system, or may be a NodeB (NB) in the WCDMA system, or may be an evolved NodeB (eNB or eNodeB) in the LTE system, or may be a radio controller in a cloud radio access network (CRAN); or the network device may be a mobile switching center, a relay station, an access point, a vehicle-mounted device, a wearable device, a hub, a switch, a network bridge, a router, a network side device in a 5G network, or a network device in a future evolved public land mobile network (PLMN), or the like.

The communication system 100 further comprises at least one terminal device 120 located within the coverage range of the network device 110. The "terminal device" used herein includes but is not limited to a transmitter connected via a wired line (such as via a public switched telephone network (PSTN), a digital subscriber line (DSL), a digital cable, a direct cable), and/or via another data connection/network, and/or via a wireless interface (such as for a cellular network, a wireless local area network (WLAN), a digital television network (such as a DVB-H network), a satellite network, AM-FM broadcast); and/or an apparatus of another terminal device that is configured to receive/transmit communication signals; and/or an Internet of Things (IoT) device. A terminal device that is configured to communicate via a wireless interface may be referred to as a "wireless communication terminal", a "wireless terminal", or a "mobile terminal". An example of the mobile terminal includes but is not limited to a satellite phone or a cellular phone; a personal communications system (PCS) terminal that may combine a cellular radio phone with a data processing capability, a fax capability, and a data communication capability; a PDA that may comprise a radio phone, a pager, Internet/Intranet access, a Web browser, a notebook, a calendar and/or a global positioning system (GPS) receiver; and a conventional laptop and/or palm receiver or other electronics that comprise radio phone transceivers. The terminal device may be an access terminal, a user equipment (UE), a user unit, a user station, a mobile station, a mobile console, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device, other processing devices connected to a wireless modem, a vehicle-mounted device, a wearable device, a terminal device in a 5G network, or a terminal device in the future evolved PLMN, or the like.

Alternatively, device to device (D2D) communication may be conducted between terminal devices 120.

Alternatively, the 5G system or the 5G network may also be referred to as a new radio (NR) system or an NR network.

FIG. 2 exemplarily shows one network device and two terminal devices, and alternatively, the communication system 100 may comprise a plurality of network devices, the coverage range of each network device may comprise other numbers of terminal devices, which is not limited in the embodiments of the present application.

Alternatively, the communication system 100 may further comprise other network entities such as a network controller and a mobility management entity, which is not limited in the embodiments of the present application.

It should be appreciated that, in the embodiments of the present application, a device with a communication function in the network/system may be referred to as a communication device. Taking the communication system 100 shown in FIG. 2 as an example, the communication device may include the network device 110 and the terminal devices 120 with communication functions, where the network device 110 and the terminal devices 120 may be specific devices described above, which will not be repeatedly described herein. The communication device may also include other devices (for example, other network entities such as a network controller and a mobility management entity) in the communication system 100, which is not limited in the embodiments of the present application.

An alternative process flow of the method for indicating PDU session status provided in the embodiments of the present disclosure is shown in FIG. 3, which comprises the following step:

S201, indicating, by a terminal device, activation and/or deactivation of a PDU session based on configuration signaling sent by a network device.

In an embodiment of the present disclosure, a UE receives configuration signaling sent by a network device, where the configuration signaling is used to instruct a terminal device to perform activation processing and/or deactivation processing on a PDU session. There is a correlation between a PDU session and a DRB, and one PDU session may be associated with one DRB, or one PDU session may be associated with a plurality of DRBs.

In some embodiments, when the configuration signaling indicates to deactivate a first PDU session or a first group of PDU sessions, the UE releases a DRB associated with the first PDU session or DRBs associated with the first group of PDU sessions based on the configuration signaling. After the UE deactivates the first PDU session or the first group of PDU sessions, a radio resource control (RRC) layer of the UE indicates, to upper layers, that the status of the first PDU session or the first group of PDU sessions is deactivated.

For example, when the configuration signaling indicates to deactivate the first group of PDU sessions, the UE releases all the DRBs associated with the first group of PDU sessions.

In some other embodiments, when the configuration signaling indicates an identifier (ID) of a first DRB or IDs of a first group of DRBs to be released, the UE releases the DRB corresponding to the first DRB ID or the DRBs corresponding to the first group of DRB IDs based on the configuration signaling. When the releasing of the DRB(s) by the UE results that at least one PDU session has no DRB associated therewith, the RRC layer of the UE indicates, to upper layers, that the status of the at least one PDU session is deactivated.

For example, a fourth PDU session is associated with three DRBs, where the first group of DRB IDs comprise three DRB IDs, and three DRBs corresponding to the three DRB IDs are associated with the fourth PDU session; when the configuration signaling indicates the IDs of the first group of DRBs to be released, the three DRBs corresponding to the three DRB IDs comprised in the first group of DRB IDs are released, and no DRB is associated with the fourth PDU session; in this case, the RRC layer of the UE indicates, to the upper layers, that the status of the fourth PDU session is deactivated.

In still other embodiments, when the configuration signaling indicates the ID of the first DRB or the IDs of the first group of DRBs to be released, and the configuration signaling further indicates to deactivate a second PDU session associated with a second DRB corresponding to a second DRB ID, the RRC layer of the terminal device indicates, to the upper layers, that the status of the second PDU session is deactivated.

For example, the configuration signaling indicates the ID of the first DRB to be released, the first DRB ID is associated with the second PDU session, and DRBs associated with the second PDU session are the first DRB, the second DRB, and a third DRB respectively; the first DRB corresponds to the first DRB ID, the second DRB corresponds to the second DRB ID, and the third DRB corresponds to a third DRB ID.

When the configuration signaling indicates only the ID of the first DRB to be released, since there is still a correlation between the second PDU session associated with the first DRB corresponding to the first DRB ID and the second DRB and the third DRB, if the configuration signaling does not indicate either to deactivate the second PDU session associated with the second DRB corresponding to the second DRB ID or to deactivate the second PDU session associated with the third DRB corresponding to the third DRB ID, the UE does not perform deactivation processing on the second PDU session. If the configuration signaling indicates to deactivate the second PDU session associated with the second DRB corresponding to the second DRB ID or indicates to deactivate the second PDU session associated with the third DRB corresponding to the third DRB ID, the UE performs deactivation processing on the second PDU session; and in this case, the RRC layer of the UE indicates the deactivation of the second PDU session to the upper layers.

Here, the second DRB ID may be the same as the first DRB ID, or the second DRB ID may be different from the first DRB ID; and the first DRB ID may belong to the first group of DRB IDs, or the first DRB ID may not belong to the first group of DRB IDs.

In yet other embodiments, when the configuration signaling indicates an ID of a second DRB or IDs of a second group of DRBs to be added by the UE, the UE adds the DRB corresponding to the second DRB ID or the DRBs corresponding to the second group of DRB IDs; and when the DRB(s) added by the UE is the first DRB(s) of a third PDU session, the RRC layer of the UE indicates, to upper layers, that the status of the third PDU session is activated.

Alternatively, the configuration signaling in the embodiments of the present disclosure is an RRC reconfiguration message, and the RRC reconfiguration message comprises a radio bearer configuration.

In an embodiment of the present disclosure, a UE can indicate, based on configuration signaling sent by a network device, that the status of a PDU session is activated and/or deactivated; the UE at an AS layer indicates the status of a PDU session to an NAS layer, so that the NAS layer of the UE can determine the status of the PDU session.

The embodiments of the present disclosure further provide a terminal device, and a schematic structural composition diagram of the terminal device 300 is shown in FIG. 4, which comprises:

a processing unit 301 configured to indicate activation and/or deactivation of a PDU session based on configuration signaling sent by a network device.

In an embodiment of the present disclosure, the processing unit 301 is configured to indicate deactivation of a first PDU session or a first group of PDU sessions to upper layers when the configuration signaling indicates to deactivate the first PDU session or the first group of PDU sessions.

In an embodiment of the present disclosure, the processing unit 301 is further configured to release a DRB associated with the first PDU session or release DRBs associated with the first group of PDU sessions.

In an embodiment of the present disclosure, when the configuration signaling indicates an ID of a first DRB or IDs of a first group of DRBs to be released, and the processing unit 301 releases the DRB corresponding to the first DRB ID or the DRBs corresponding to the first group of DRB IDs based on the configuration signaling such that at least one PDU session has no DRB associated therewith, the processing unit 301 is configured to indicate deactivation of the at least one PDU session to upper layers.

In an embodiment of the present disclosure, when the configuration signaling further indicates to deactivate a second PDU session associated with a second DRB corresponding to a second DRB ID, the processing unit 301 is configured to indicate deactivation of the second PDU session to the upper layers, where the second DRB ID is the same as or different from the first DRB ID, and the first DRB ID belongs to the first group of DRB IDs, or the first DRB ID does not belong to the first group of DRB IDs.

In an embodiment of the present disclosure, when the configuration signaling indicates an ID of a second DRB or IDs of a second group of DRBs to be added by the UE and the processing unit 301 adds the DRB corresponding to the second DRB ID or the DRBs corresponding to the second group of DRB IDs as the first DRB(s) of the third PDU session, the processing unit 301 is configured to indicate activation of a third PDU session to upper layers.

It should be noted that the UE involved in the embodiments of the present disclosure is located at the AS layer.

The embodiments of the present disclosure further provide a terminal device, which comprises a processor and a memory for storing a computer program capable of running on the processor, where the processor is configured to implement steps of the method for indicating PDU session status carried out by the terminal device, when the computer program is run.

Figure 5:
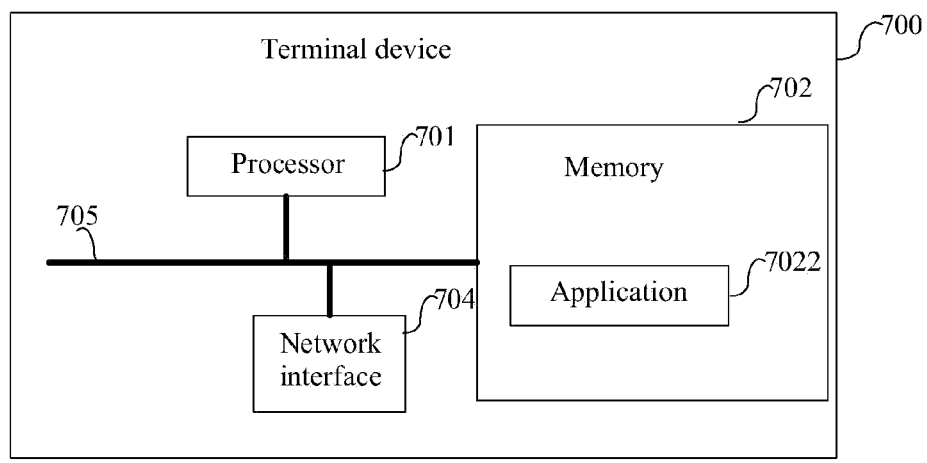
FIG. 5 is a schematic structural diagram of hardware components of a terminal device provided in an embodiment of the present disclosure.

FIG. 5 is a schematic structural diagram of hardware components of a terminal device according to an embodiment of the present disclosure, and the terminal device 700 comprises: at least one processor 701, a memory 702, and at least one network interface 704. Various components in the terminal device 700 are coupled together via a bus system 705. It can be appreciated that the bus system 705 is used to implement connections and communications among these components. The bus system 705 further comprises, in addition to a data bus, a power bus, a control bus, and a status signal bus. However, for clarity of illustration, various buses are all labeled as the bus system 705 in FIG. 5.

It can be appreciated that the memory 702 may be a volatile memory or a non-volatile memory, or may comprise both the volatile and non-volatile memories. The non-volatile memory may be a ROM, a programmable read-only memory (PROM), an erasable programmable read-only memory (EPROM), an electrically erasable programmable read-only memory (EEPROM), a ferromagnetic random access memory (FRAM), a flash memory, a magnetic surface memory, a compact disc, or a compact disc read-only memory (CD-ROM); and the magnetic surface memory may be a disk memory or a tape memory. The volatile memory may be a random access memory (RAM) that acts as an external cache. By way of the exemplary but not restrictive illustration, many forms of RAMs are available, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 702 described in the embodiments of the present disclosure is intended to include, but is not limited to, these and any other suitable types of memories.

The memory 702 in the embodiments of the present disclosure is configured to store various types of data to support operations of the terminal device 700. Examples of these data comprise any computer program (such as an application 7022) for operating on the terminal device 700. A program for implementing the method according to the embodiments of the present disclosure may be comprised in the application 7022.

The method disclosed in the above embodiments of the present disclosure may be applied in the processor 701 or implemented by the processor 701. The processor 701 may be an integrated circuit chip with a signal processing capability. During the implementation, various steps of the method described above may be completed by an integrated logic circuit of hardware components or by instructions in a form of software in the processor 701. The processor 701 may be a general-purpose processor, a digital signal processor (DSP), or other programmable logic devices, discrete gates or transistor logic devices, discrete hardware components, or the like. The processor 701 may implement or perform the methods, steps, and logic block diagrams disclosed in the embodiments of the present disclosure. The general-purpose processor may be a microprocessor or any conventional processor, etc. The steps of the method disclosed in the embodiments of the present disclosure may be directly embodied as being implemented by a hardware decoding processor, or by a combination of hardware and software modules in the decoding processor. The software module may be located in a storage medium, the storage medium is located in the memory 702, and the processor 701 reads information in the memory 702 and completes the steps of the method above in combination with the hardware components thereof.

In an exemplary embodiment, the terminal device 700 may be implemented by one or more of an application-specific integrated circuit (ASIC), a DSP, a programmable logic device (PLD), a complex programmable logic device (CPLD), an FPGA, a general-purpose processor, a controller, an MCU, an MPU, or other electronic elements, to carry out the method described above.

In some embodiments, a method for indicating protocol data unit session status is provided, which includes that: a network device sends configuration signaling to a terminal device. The configuration signaling is used for the terminal device to indicate activation and/or deactivation of a protocol data unit session (PDU session), and the configuration signaling is a radio resource control (RRC) reconfiguration message.

In some embodiments, when the configuration signaling indicates to deactivate a first PDU session or a first group of PDU sessions, the configuration signaling is used for a radio resource control (RRC) layer to indicate deactivation of the first PDU session or the first group of PDU sessions to upper layers of the terminal device.

In some embodiments, when the configuration signaling indicates to release an identifier (ID) of a first DRB or IDs of a first group of DRBs, the configuration signaling is used for an RRC layer to indicate, to upper layers of the terminal device, deactivation of at least one PDU session when the terminal device releases a DRB corresponding to the first DRB ID or DRBs corresponding to the first group of DRB IDs based on the configuration signaling such that the at least one PDU session has no DRB associated therewith. The RRC reconfiguration message comprises a radio bearer configuration.

In some embodiments, when the configuration signaling further indicates to deactivate a second PDU session associated with a second DRB corresponding to a second DRB ID, the configuration signaling is used by the RRC layer to indicate, to the upper layers of the terminal device, deactivation of the second PDU session; where the second DRB ID is the same as or different from the first DRB ID, and the first DRB ID belongs to the first group of DRB IDs, or the first DRB ID does not belong to the first group of DRB IDs.

In some embodiments, when the configuration signaling indicates an ID of a second DRB or IDs of a second group of DRBs to be added by the terminal device, the configuration signaling is used by an RRC layer to indicate, to upper layers of the terminal device, activation of a third PDU session, where the DRB corresponding to the second DRB ID or the DRBs corresponding to the second group of DRB IDs is added by the terminal device as the first DRB(s) of the third PDU session.

In some embodiments, a network device is provided, which includes a transceiver, configured to send configuration signaling to a terminal device, where the configuration signaling is used for the terminal device to indicate activation and/or deactivation of a protocol data unit session (PDU session), and the configuration signaling is a radio resource control (RRC) reconfiguration message.

In some embodiments, when the configuration signaling indicates to deactivate a first PDU session or a first group of PDU sessions, the configuration signaling is used for a radio resource control (RRC) layer to indicate, to upper layers of the terminal device, deactivation of the first PDU session or the first group of PDU sessions.

In some embodiments, when the configuration signaling indicates to release an identifier (ID) of a first DRB or IDs of a first group of DRBs, the configuration signaling is used for an RRC layer to indicate, to upper layers of the terminal device, deactivation of at least one PDU session when the terminal device releases a DRB corresponding to the first DRB ID or DRBs corresponding to the first group of DRB IDs based on the configuration signaling such that the at least one PDU session has no DRB associated therewith, and the RRC reconfiguration message comprises a radio bearer configuration.

The embodiments of the present application further provide a computer readable storage medium for storing a computer program.

Alternatively, the computer readable storage medium may be applied to the terminal device in the embodiments of the present application, the computer program causes a computer to implement corresponding flows, which are implemented by the terminal device in various methods of the embodiments of the present application, which will not be repeatedly described herein for brevity.

The present disclosure is described by referring to the flow charts and/or block diagrams of the methods, devices (systems) and computer program products according to the embodiments of the present disclosure. It should be appreciated that each flow and/or block in the flow charts and/or block diagrams and any combination of the flows and/or blocks in the flow charts and/or block diagrams may be implemented with computer program instructions. These computer program instructions may be provided to a processor of a general-purpose computer, a dedicated-purpose computer, an embedded processor or other programmable data processing devices to generate a machine, so that the instructions executed by the processor of a computer or other programmable data processing devices generate a means for implementing the functions specified in one or more flows of the flow charts and/or one or more blocks of the block diagrams.

These computer program instructions may also be stored in a computer readable memory which may guide a computer or other programmable data processing devices to operate in a specific manner, so that the instructions stored in the computer-readable memory generate an article of manufacture comprising an instruction means which can implement the functions specified in one or more flows of the flow charts and/or one or more blocks of the block diagrams.

These computer program instructions may also be loaded in a computer or other programmable data processing devices, so that a series of operation steps are implemented by the computer or other programmable devices to realize computer-implemented processing and thus the instructions executed by the computer or other programmable devices provide steps for implementing the functions specified in one or more flows of the flow charts and/or one or more blocks of the block diagrams.

The above descriptions are merely preferred embodiments of the invention, but not intended to limit the protection scope of the present disclosure, any modifications, equivalent replacements, improvements, etc. made within the spirit and principles of the present disclosure should be included within the protection scope of the present disclosure.

The invention claimed is:

1. A method for indicating protocol data unit (PDU) session status, comprising:
    indicating, by a terminal device, activation and/or deactivation of the PDU session based on configuration signaling sent by a network device,
    wherein indicating, by the terminal device, the activation and/or deactivation of the PDU session based on the configuration signaling sent by the network device comprises:
    indicating, by a radio resource control (RRC) layer to upper layers of the terminal device, deactivation of at least one PDU session when the terminal device releases a data radio bearer (DRB) corresponding to an identifier (ID) of a first DRB or DRBs corresponding to IDs of a first group of DRBs based on the configuration signaling such that the at least one PDU session has no DRB associated therewith, wherein the configuration signaling indicates to release the first DRB ID or the first group of DRB IDs.

2. The method of claim 1, wherein indicating, by the terminal device, the activation and/or deactivation of the PDU session based on the configuration signaling sent by the network device comprises:
    indicating, by the RRC layer to the upper layers of the terminal device, deactivation of a first PDU session or a first group of PDU sessions when the configuration signaling indicates to deactivate the first PDU session or the first group of PDU sessions.

3. The method of claim 2, wherein before indicating, by the RRC layer to the upper layers of the terminal device, the deactivation of the first PDU session or the first group of PDU sessions, the method further comprises:
    releasing, by the terminal device, a DRB associated with the first PDU session or DRBs associated with the first group of PDU sessions.

4. The method of claim 1, wherein indicating, by the terminal device, the activation and/or deactivation of the PDU session based on the configuration signaling sent by the network device comprises:
    indicating, by the RRC layer to the upper layers of the terminal device, deactivation of a second PDU session when the configuration signaling further indicates to deactivate the second PDU session associated with a second DRB corresponding to a second DRB ID,
    wherein
    the second DRB ID is the same as or different from the first DRB ID, and the first DRB ID belongs to the first group of DRB IDs, or the first DRB ID does not belong to the first group of DRB IDs.

5. The method of claim 1, wherein indicating, by the terminal device, the activation and/or deactivation of the PDU session based on the configuration signaling sent by the network device comprises:
    indicating, by the RRC layer to the upper layers of the terminal device, activation of a third PDU session, when the configuration signaling indicates an ID of a second DRB or IDs of a second group of DRBs to be added by the terminal device, and the terminal device adds the DRB corresponding to the second DRB ID or the DRBs corresponding to the second group of DRB IDs as the first DRB(s) of the third PDU session.

6. A terminal device, comprising:
    a processor, configured to indicate activation and/or deactivation of a protocol data unit session (PDU session) based on configuration signaling sent by a network device,
    wherein the processor is further configured to indicate deactivation of at least one PDU session to upper layers when the processor releases a data radio bearer (DRB) corresponding to an identifier (ID) of a first DRB or DRBs corresponding to IDs of a first group of DRBs based on the configuration signaling such that the at least one PDU session has no DRB associated therewith, wherein the configuration signaling indicates to release the first DRB ID or the first group of DRB IDs.

7. The terminal device of claim 6, wherein the processor is configured to indicate deactivation of a first PDU session or a first group of PDU sessions to the upper layers when the configuration signaling indicates to deactivate the first PDU session or the first group of PDU sessions.

8. The terminal device of claim 7, wherein the processor is further configured to release a DRB associated with the first PDU session or release DRBs associated with the first group of PDU sessions.

9. The terminal device of claim 6, wherein when the configuration signaling further indicates to deactivate of a second PDU session associated with a second DRB corresponding to a second DRB ID, the processor is configured to indicate deactivation of the second PDU session to the upper layers, wherein
    the second DRB ID is the same as or different from the first DRB ID, and the first DRB ID belongs to the first group of DRB IDs, or the first DRB ID does not belong to the first group of DRB IDs.

10. The terminal device of claim 6, wherein when the configuration signaling indicates an ID of a second DRB or IDs of a second group of DRBs to be added by the terminal device, and the processor adds the DRB corresponding to the second DRB ID or the DRBs corresponding to the second group of DRB IDs as the first DRB(s) of a third PDU session,
    the processor is configured to indicate activation of the third PDU session to the upper layers.

11. A method for indicating protocol data unit (PDU) session status, comprising:

sending, by a network device, configuration signaling to a terminal device, wherein the configuration signaling is used for the terminal device to indicate activation and/or deactivation of the PDU session, and wherein when the configuration signaling indicates to release an identifier (ID) of a first DRB or IDs of a first group of DRBs, the configuration signaling is used for a radio resource control (RRC) layer to indicate, to upper layers of the terminal device, deactivation of at least one PDU session when the terminal device releases a DRB corresponding to the first DRB ID or DRBs corresponding to the first group of DRB IDs based on the configuration signaling such that the at least one PDU session has no DRB associated therewith.

12. The method of claim 11, wherein when the configuration signaling indicates to deactivate a first PDU session or a first group of PDU sessions, the configuration signaling is used for the RRC layer to indicate deactivation of the first PDU session or the first group of PDU sessions to the upper layers of the terminal device.

13. The method of claim 11, wherein when the configuration signaling further indicates to deactivate a second PDU session associated with a second DRB corresponding to a second DRB ID, the configuration signaling is used by the RRC layer to indicate, to the upper layers of the terminal device, deactivation of the second PDU session;

wherein the second DRB ID is the same as or different from the first DRB ID, and the first DRB ID belongs to the first group of DRB IDs, or the first DRB ID does not belong to the first group of DRB IDs.

14. The method of claim 11, when the configuration signaling indicates an ID of a second DRB or IDs of a second group of DRBs to be added by the terminal device, the configuration signaling is used by the RRC layer to indicate, to the upper layers of the terminal device, activation of a third PDU session, wherein the DRB corresponding to the second DRB ID or the DRBs corresponding to the second group of DRB IDs is added by the terminal device as the first DRB(s) of the third PDU session.

15. A network device, comprising:

a transceiver, configured to send configuration signaling to a terminal device, wherein the configuration signaling is used for the terminal device to indicate activation and/or deactivation of a protocol data unit (PDU) session, and wherein when the configuration signaling indicates to release an identifier (ID) of a first DRB or IDs of a first group of DRBs, the configuration signaling is used for a radio resource control (RRC) layer to indicate, to upper layers of the terminal device, deactivation of at least one PDU session when the terminal device releases a DRB corresponding to the first DRB ID or DRBs corresponding to the first group of DRB IDs based on the configuration signaling such that the at least one PDU session has no DRB associated therewith.

16. The network device of claim 15, wherein when the configuration signaling indicates to deactivate a first PDU session or a first group of PDU sessions, the configuration signaling is used for the RRC layer to indicate, to the upper layers of the terminal device, deactivation of the first PDU session or the first group of PDU sessions.

17. The network device of claim 15, wherein when the configuration signaling further indicates to deactivate a second PDU session associated with a second DRB corresponding to a second DRB ID, the configuration signaling is used by the RRC layer to indicate, to the upper layers of the terminal device, deactivation of the second PDU session;

wherein the second DRB ID is the same as or different from the first DRB ID, and the first DRB ID belongs to the first group of DRB IDs, or the first DRB ID does not belong to the first group of DRB IDs.

18. The network device of claim 15, when the configuration signaling indicates an ID of a second DRB or IDs of a second group of DRBs to be added by the terminal device, the configuration signaling is used by the RRC layer to indicate, to the upper layers of the terminal device, activation of a third PDU session, wherein the DRB corresponding to the second DRB ID or the DRBs corresponding to the second group of DRB IDs is added by the terminal device as the first DRB(s) of the third PDU session.

* * * * *